United States Patent [19]

Wang et al.

[11] Patent Number: 4,533,646

[45] Date of Patent: Aug. 6, 1985

[54] NITRIDE BONDED OXIDE REFRACTORIES

[75] Inventors: Ke-Chin Wang, Pittsburgh; Howard M. Winkelbauer, Mifflin, both of Pa.

[73] Assignee: Dresser Industries, Inc., Dallas, Tex.

[21] Appl. No.: 613,941

[22] Filed: May 24, 1984

Related U.S. Application Data

[63] Continuation of Ser. No. 384,709, Jun. 3, 1982, abandoned.

[51] Int. Cl.$^3$ .................... C04B 35/58; C04B 35/18; C04B 35/10
[52] U.S. Cl. .................... 501/97; 501/120; 501/127; 501/128
[58] Field of Search .............. 501/89, 92, 97, 120, 501/127, 128

[56] References Cited

U.S. PATENT DOCUMENTS

| | | | |
|---|---|---|---|
| 2,636,826 | 4/1953 | Nicholson | 501/92 |
| 2,752,258 | 6/1956 | Swentzel | 501/92 |
| 3,991,166 | 11/1976 | Jack et al. | 423/327 |
| 4,104,075 | 8/1978 | Hayashi et al. | 501/92 |
| 4,187,116 | 2/1980 | Lange | 501/92 |
| 4,243,621 | 1/1981 | Mori et al. | 501/98 |

FOREIGN PATENT DOCUMENTS

| | | | |
|---|---|---|---|
| 77-105157 | 3/1979 | Japan . | |
| 2075966 | 11/1981 | United Kingdom | 501/96 |

*Primary Examiner*—Mark L. Bell
*Attorney, Agent, or Firm*—Barry E. Deutsch

[57] ABSTRACT

This invention relates to a method for producing nitride bonded refractory shapes in which the bonding matrix is formed in situ. The method comprises forming a batch including a coarser portion selected from the group calcined and fused aggregates of alumina, aluminosilicate, and magnesium aluminate spinel and a finer portion consisting essentially of finely divided silicon metal and alumina as well as fines of the above mentioned refractory aggregate needed to achieve the desired screen analysis. The silicon metal and alumina react in the nitriding atmosphere to form a low porosity matrix generally comprising silicon oxynitride with corundum distributed therethrough.

2 Claims, No Drawings

NITRIDE BONDED OXIDE REFRACTORIES

This is a continuation of application Ser. No. 384,709 filed June 3, 1982 now abandoned.

DESCRIPTION

1. Technical Field

This invention relates to nitride bonded oxide refractories and the method of making the same.

2. Background Art

Nitride bonding of silicon carbide grain is well established as shown, for example, in U.S. Pat. No. 2,752,258. There has been considerable recent interest in the nitride bonding of oxide refractory aggregates. Use of both aluminum metal and silicon metal in the fine portion of the batches that are shaped and heated in a nitriding atmosphere are suggested, for example, in published Japanese Patent Application No. 1977-1051157 to Ueno and Katsura and U.S. Pat. No. 4,243,621 to Mori, Ogawa and Takai. The Ueno et al. application discloses the inclusion of fine alumina, silica or aluminosilicates in the batch. Mori et al. discloses as essential silica powder in the batch and optionally alumina powder. U.S. Pat. No. 3,991,166 to Jack and Wilson discloses a method of producing a ceramic material by nitriding a mixture of silicon and aluminum powders in which the atomic ratio of silicon to aluminum is not less than 1:3.

While the general approach to nitride bonding of oxide refractories has been investigated and explained in the documents noted above, there has remained a need for a practical and less expensive process for making nitride bonded oxide refractories with excellent bulk properties.

DISCLOSURE OF THE INVENTION

It is an object of this invention to provide a practical and less expensive process for the manufacture of nitride bonded oxide refractory with excellent bulk properties. It is a further object of this invention to provide a refractory composition especially suitable for the containment of molten aluminum. It is yet another object of this invention to provide a refractory composition suitable for confining the contents of a non-ferrous containing electrolysis cell. It is a still further object of this invention to provide a refractory composition suitable for slide gates used in the teeming of molten steel.

Briefly according to this invention, there is provided a method of producing nitride bonded refractory shapes in which the bonding matrix is formed in situ. The method comprises first forming a brickmaking size graded batch from refractory oxide aggregates including a coarser portion selected from the group: calcined and fused aggregates of alumina, aluminosilicate, and magnesium aluminate spinel. The batch also includes a finer portion consisting essentially of finely divided silicon metals in an amount between about three and twenty percent by weight of the entire batch and alumina in an amount between three and twenty percent by weight of the entire batch. The ratio of fine alumina to fine silicon metal should preferably be at least 1:4. The batch is mixed and tempered with a temporary binder and then formed into a shape by conventional brickmaking or shapemaking techniques including, for example, power pressing. After drying, the shapes are heated in a nitriding atmosphere until substantially all the silicon metal is reacted with nitrogen. Examination of the matrix of compositions made according to this invention with an electron microprobe demonstrate that the elements aluminum, oxygen, silicon, and nitrogen are distributed more or less uniformly throughout with portions higher in aluminum and oxygen and other portions higher in silicon and nitrogen. X-ray diffraction anaylsis of the bonding phases identifies silicon oxynitride, $\beta'$ sialon and corundum.

The calcined and fused aggregates included in the coarser portion of the batch according to this invention should have low iron oxide, chrome oxide, and lime (CaO) contents. Iron and chrome oxides are reduced to metals under nitriding conditions. Also, under nitriding conditions, the lime migrates into the matrix and upon reheating under oxidizing conditions causes the brick to exhibit a bubbling phenomenon. The lime, iron oxide, and chromium oxide content of the aggregate should each preferably be less than about one percent by weight and the lower the better.

Refractory compositions prepared according to the process disclosed herein are especially suitable for certain highly critical applications.

BEST MODE FOR CARRYING OUT THE INVENTION

Nitride bonded aluminosilicate refractory shapes were prepared from the batches set forth in Table I. Compositions 1 and 2 are accordingto the teachings of the invention being disclosed and claimed. By way of comparison, compositions C1, C2, and C3 illustrate other ways to achieve a nitride bond.

TABLE I

| Example: | 1 | 2 | C1 | C2 | C3 |
|---|---|---|---|---|---|
| Mix (weight percent, calcined aluminosilicate (about 50% Al$_2$O$_3$)): | 88% | 78% | 72% | 69% | 84% |
| Silica powder (SiO$_2$): | — | — | 13 | 13 | — |
| Fine alumina (Al$_2$O$_3$): | 4 | 8 | — | — | — |
| Raw clay: | 2 | 2 | 2 | — | 3 |
| Aluminum metal: | — | — | 13 | 13 | — |
| Silicon metal: | 6 | 12 | — | 5 | — |

Each of the mixes set forth in Table I was sized and graded to form a typical brickmaking batch. The batches were blended with binders and pressed into shapes. The forming techniques were approximately the same for all mixes but certainly not precisely the same; for example, Examples 1 and 2 were formed on an impact press at 80, psi being hammered for ten seconds. Mix C2 was likewise formed, except that the hammering time was twenty seconds.

After drying, the shapes were heated in a nitriding atmosphere until the metals in the batch were substantially entirely reacted with nitrogen present in the heating atmosphere and/or oxygen borrowed from other batch ingredients. Properties of the nitride bonded shapes are set forth in Table II. The results under the column head C3' are for another manufacture of Example C3.

TABLE II

| Example | 1 | 2 | C1 | C2 | C3 | C3' |
|---|---|---|---|---|---|---|
| Bulk density, pcf: | 146 | 148 | 150 | 148 | 152 | 143 |
| Apparent Porosity, %: | 18.2 | 18.2 | 23 | 22.2 | 15.2 | 15 |

TABLE II-continued

| Example | 1 | 2 | C1 | C2 | C3 | C3' |
|---|---|---|---|---|---|---|
| Nitrogen Content (N), %: | 3.76 | 7.2 | 5.8 | 5.9 | N.D. | 7.3 |
| Modulus of Rupture psi (Av 2): | | | | | | |
| At Room Temperature: | 2500 | 3500 | 2700 | 2320 | 2720 | 1900 |
| At 2000° F. (1093° C.): | 3510 | 4540 | 3000 | 2480 | 2710 | 3500 |
| At 2700° F. (1482° C.): | 720 | 2290 | 1100 | N.D. | N.D. | 2200 |
| X-ray Diffraction of Bonding Phase: | $Si_2ON_2$ | $Si_2ON_2$ corundum | corundum $\beta'$Sialon | $\beta'$Sialon $Si_2ON_2$ | | |

The data in Table II establishes that each example has adequate physical properties but the hot strength as measured by modulus of rupture was markedly superior for those (Examples 1 and 2) according to this invention. Use of aluminum metal only (Example C1), use of a mixture of aluminum metal and silicon metal (Example C2), or use of silicon metal without alumina (Example C3) resulted in lower hot strenghts. The mineralogical characteristic of the bonding matrix differed from example to example and comparative example to comparative example depending upon the batch ingredients. Simply stated, those examples according to this invention have more alumina (corundum) dispersed in the nitride bonding matrix. Of course, the total amount of nitride bonding as well as the characteristics of the bonding matrix must be considered in interpreting these results. The nitrogen content may be taken as an approximate indication of the amount of nitride bonding. Example 2 was prepared from a batch having twice as much silicon metal as Example 1 and the nitrogen content of Example 2 is about double that of Example 1. The strength at all temperatures reflects the increased amount of bonding.

Examples 1 and 2 are especially suitable for use in applications such as the non-ferrous electrolysis process for the manufacture of non-ferrous metals.

Much has been made in the prior art of the $\beta'$ sialon phase as a desirable bonding phase. While a certain amount of $\beta'$ sialon may exist in compositions according to this invention, the bonding phases identified by X-ray diffraction are primarily silicon oxynitride and corundum. The temperatures of the nitriding step and the ratio of ingredients are critical for the development of the $\beta'$ sialon phase. Typically temperatures on the order of 1700° to 2000° C. are required and no more than about sixty percent alumina in the silicon nitride can be tolerated.

Nitride bonded fused magnesium spinel grain brick were prepared from the batches set forth in Table III. Examples 3, 4 and 5 are according to the teachings of this invention. Examples C4, C5, and C6 are comparative examples illustrating other ways in which nitride bonding can be achieved.

TABLE III

| Example: | 3 | 4 | 5 | C4 | C5 | C6 |
|---|---|---|---|---|---|---|
| Fused Grain Type: | (90% $Al_2O_3$) | (70% $Al_2O_3$) | (60% $Al_2O_3$) | (70% $Al_2O_3$) | (70% $Al_2O_3$) | (70% $Al_2O_3$) |
| Mix (weight percent) | 86.7% | 86.7% | 86.7% | 87% | 84% | 72% |
| Fused Spinel Grain: | | | | | | |
| Silica Powder: | — | — | — | — | — | 13 |
| Fine Alumina: | 7.3 | 7.3 | 7.3 | — | — | — |
| Raw Clay: | — | — | — | — | 3 | 2 |
| Aluminum Metal: | — | — | — | — | — | 13 |
| Silicon Metal: | 6.0 | 6.0 | 6.0 | 13 | 13 | — |

The batches described in Table III were made into shapes. Examples 4 and C4, C5, and C6 were power pressed whereas Examples 3 and 5 were impact pressed with a twenty second hammer time. After shaping and drying, the mixes were heated in a nitriding atmosphere. The properties of the resulting nitride bonding shapes are set forth in Table IV.

TABLE IV

| Example: | 3 | 4 | 5 | C4 | C5 | C6 |
|---|---|---|---|---|---|---|
| Bulk density, pcf: | 190 | 185 | 188 | 172 | 176 | 173 |
| Apparent porosity, %: | 15.4 | 15 | 13.2 | 18.2 | 14.3 | 17.9 |
| Nitrogen content (N), %: | 4 | 3.5 | 3.3 | 8.15 | 7.6 | 5.84 |
| Modulus of Rupture, psi (Av 2) | | | | | | |
| At Room temperature: | N.D. | 2980 | 2650 | 1490 | 2480 | 3060 |
| At 2000° F. (1093° C.): | N.D. | 5457 | 3231 | 3080 | 3420 | 3890 |
| At 2700° F. (1482° C.): | 920 | (melted) | (melted) | (body glazed) | (body glazed) | 1090 |
| X-ray diffraction analysis Phases other than Spinel (Decreasing Intensity): | Corundum $\beta'$Sialon | N.D. | N.D. | $\beta Si_3N_4$ $\alpha Si_3N_4$ | $\beta Si_3N_4$ $Si_2ON_2$ | * |

*Mg-containing $\beta'$ sialon, 12H magnesium sialon polytype, corundum

The data in Table IV shows the nitride bonded shapes made with fused magnesium aluminate spinel grain of various compositions can be provided with excellent hot strength as measured by modulus of rupture at 2000° F. The grains having the highest alumina content provided the best properties to the nitride bonded brick. Magnesium aluminate by itself has excellent compatability with molten aluminum and the nitride bonded shapes made therefrom have properties suited for applications in the manufacture of aluminum. Magnesium aluminate spinel has a known tendency to creep under load at elevated temperatures. The nitride bonded matrix diminishes this drawback. Moreover, the thermal shock resistance and resistance to alkali attack of fused spinel brick as made according to this invention are superior.

The strengths at 2700° F. set forth in Table IV are of interest but are not particularly relevant to the use of such compositions in the manufacture of aluminum wherein temperatures are not generally in excess of 2000° F.

Nitride bonded high alumina shapes were prepared from batches set forth in Table V.

TABLE V

| Example | 6 | 7 | 8 |
|---|---|---|---|
| Mix (weight percent) | 20% | | |
| Calcined aluminosilicate (about 70% $Al_2O_3$): | | | |
| Calcined Bauxite (South American): | | | 20% |
| Synthetic alumina: | 65 | 85 | 65 |
| Silicon: | 13 | 13 | 13 |
| Raw clay: | 2 | 2 | 2 |

The batches were mixed with a binder and made into plates (about 9×4.5×1.375 inches) on a bumping press. After drying, they were heated in a nitriding atmosphere to form nitride bonded shapes. The purpose of making plates was to prepare a shape for use as a slide gate.

The properties of the plates of Examples 6, 7, 8 are set forth in Table VI.

TABLE VI

| Example | 6 | 7 | 8 |
|---|---|---|---|
| Bulk density, pcf: | 178 | 188 | 184 |
| Apparent porosity, %: | 17.8 | 17.2 | 17.7 |
| Nitrogen (N), %: | 7.08 | 6.96 | 6.84 |
| Modulus of Ruputure psi (1 × ⅜ × 6″ bars) | | | |
| At Room Temperature: | 2780 | 2220 | 2990 |
| At 2000° F. (1093° C.): | 5430 | 4620 | 4710 |
| At 2700° F. (1482° C.): | 3610 | 3490 | 2770 |

These nitride bonded high alumina compositions have not strengths as shown in Table VI approaching that of nitride bonded silicon carbide. They also have excellent thermal shock resistance and thus are suitable compositions for slide gates used to gate the flow of molten metal during teeming. Slide gates have been fabricated from Example 7 and have been impregnated with petroleum pitch followed by coking at 2000° F. There was no indication of any reaction between the carbon and the nitride phases.

In the foregoing mixes, the refractory aggregate was sized to form a brickmaking batch, for example, such that seven to twenty percent was retained on a ten mesh screen; about twenty-three to thirty-six percent was minus ten on twenty-eight mesh; about fifteen to nineteen percent was minus twenty-eight on sixty-five mesh; about seven to ten percent was minus sixty-five on two hundred mesh; and about thirty to thirty-five percent passed the two hundred mesh screen. All the above mesh sizes are based on the Tyler Standard Series.

The refractory aggregates used in the examples have the approximate chemical analyses as set forth below:

| | Calcined Aluminosilicate | Crude Clay | Synthetic Alumina |
|---|---|---|---|
| $SiO_2$ | 47.3% | 62.9% | 0.1% |
| $Al_2O_3$ | 49.2 | 33.5 | 99.6 |
| $TiO_2$ | 2.4 | 2.1 | 0.01 |
| $Fe_2O_3$ | 1.0 | 1.0 | 0.2 |
| CaO | 0.02 | 0.2 | 0.04 |
| MgO | 0.04 | 0.3 | 0.04 |
| Alk. | 0.08 | 0.5 | 0.05 |
| Spinal Grains for Examples 3, 4, 5 and C4, C5, C6 | | | |
| $SiO_2$ | 0.11% | 0.25% | 0.40% | 0.2% |
| $Al_2O_3$ | 89.2 | 69.6 | 57.5 | 69.0 |
| $TiO_2$ | 0.01 | 0.02 | 0.03 | 0.04 |
| $Fe_2O_3$ | 0.21 | 0.17 | 0.21 | 0.09 |
| CaO | 0.10 | 0.19 | 0.40 | 0.54 |
| MgO | 9.93 | 29.7 | 41.4 | 30.1 |
| Alk. | 0.44 | 0.04 | 0.02 | N.D. |

All of the chemical analyses are based on an oxide analysis.

In the examples, the batches were tempered with a solution of Dextrin or lignin liquor and water which provided a temporary binder. The bricks were typically nitrided in the presence of flowing nitrogen at a temperature of about 2600° F. (1420° C.) with the hold time of about four hours.

To successfully achieve nitriding and also an economical firing schedule, it is preferred that the starting silicon metal powder be as fine as possible. Generally, the silicon powder should have an average particle diameter of about 6.3 microns or less with ninety-five percent of the particles being finer than 30 microns.

It is preferred that the reactive material not exceed twenty percent of the mix for economic reasons. Also, larger quantities do not result in articles with materially improved physical properties.

Having thus defined my invention with the detail and particularity required by the Patent Laws, what is desired protected by Letters Patent is set forth in the following claims.

We claim:

1. A nitride bonded refractory shape formed by an in situ reaction in a nitriding atmosphere consisting essentially of a size graded batch comprising 55 to 63 percent, by weight, −3 to +65 mesh Tyler coarse refractory aggregate, selected from the group consisting of calcined and fused aggregates of alumina, alumino-silicate, and magnesium aluminate spinel, and 37 to 45 percent, by weight, of a −65 mesh Tyler, fine portion consisting essentially of 3 to 20 percent, by weight, silicon metal, 0.75 to 20 percent, by weight, alumina, and the balance consisting of fines of the refractory aggregate, the weight ratio of said −65 mesh Tyler alumina to said −65 mesh Tyler silicon, equaling at least 1:4.

2. The shape of claim 1 wherein the refractory aggregate is substantially free of iron oxide, chrome oxide and lime.

* * * * *